United States Patent [19]
Sanders et al.

[11] Patent Number: 5,999,304
[45] Date of Patent: Dec. 7, 1999

[54] FIBER OPTIC GYROSCOPE WITH DEADBAND ERROR REDUCTION

[75] Inventors: Glen Sanders, Scottsdale; Rudy Dankwort, Phoenix, both of Ariz.; Lee Strandjord, Hennepin, Minn.; Ralph Bergh, Phoenix, Ariz.

[73] Assignee: Honeywell, Inc., Minneapolis, Minn.

[21] Appl. No.: 08/905,616

[22] Filed: Aug. 4, 1997

[51] Int. Cl.[6] .......................... G02B 26/00; G01C 19/72
[52] U.S. Cl. .................. 359/237; 359/239; 359/279; 356/350; 385/3; 385/12
[58] Field of Search .................... 359/237, 238, 359/239, 276, 279; 356/350; 385/3, 9, 32, 12

[56] References Cited

U.S. PATENT DOCUMENTS

| | | | |
|---|---|---|---|
| 4,842,358 | 6/1989 | Hall | 356/250 |
| 5,386,290 | 1/1995 | Okada | 356/350 |
| 5,457,532 | 10/1995 | August et al. | 356/350 |
| 5,473,430 | 12/1995 | Kemmler | 356/350 |
| 5,504,580 | 4/1996 | Hollinger et al. | 356/350 |
| 5,555,235 | 9/1996 | Kumagai et al. | 356/350 |
| 5,684,591 | 11/1997 | Lo et al. | 356/350 |

OTHER PUBLICATIONS

Guenter Spahlinger, et al., "Error Compensation via Signal Correlation in High Precision Closed–Loop Fiber Optic Gyros", LITEF GmbH, Development Department, Loerrachestr, 18, 79115 Freiburg, Germany, 218/SPIE vol. 2837, 10 pgs., Aug. 1996.

George A. Pavloth, "Closed–loop Fiber Optic Gyros", Litton Systems, Inc., 46/SPIE vol. 2837, 16 pgs., Aug. 1996.

*Primary Examiner*—Loha Ben
*Attorney, Agent, or Firm*—Albert K. Kau

[57] ABSTRACT

A deadband error reducer for a fiber optic gyroscope, which is an offset modulation signal that averages the deadband producing error over the range of the feedback modulation signal provided to the phase modulator. Although the offset modulation signal may be introduced at any of several points in the feedback loop, the offset modulation must approximate a critical amplitude at the phase modulator. If the offset modulation is a signal having segments that are linear with time, the critical amplitude of this signal will be $2\pi$.

21 Claims, 11 Drawing Sheets

MODULATED
PHOTODETECTOR OUTPUT

SAMPLED SYSTEM
$A_i, B_i$ ARE DIGITAL
NUMBERS $$\sum_i (A_i - B_i) = \text{CONST} \cdot \Omega$$

FIBER OPTIC GYROSCOPE WITH DEADBAND ERROR REDUCTION

FIELD OF THE INVENTION

The present invention concerns fiber optic gyroscopes having deadband reduction schemes. More particularly, this invention is a fiber optic gyroscope that alleviates false indications of rotation rate at very slow rates of sensing coil rotation through the use of an offset modulation signal.

BACKGROUND OF THE INVENTION

Fiber optic gyroscopes are an attractive means with which to sense rotation of an object supporting such a gyroscope. Such gyroscopes can be made quite small and can be constructed to withstand considerable mechanical shock, temperature change, and other environmental extremes. Due to the absence of moving parts, they can be nearly maintenance free, and they have the potential of becoming economical in cost. They can also be sensitive to low rotation rates that can be a problem in other kinds of optical gyroscopes.

Figure 1:
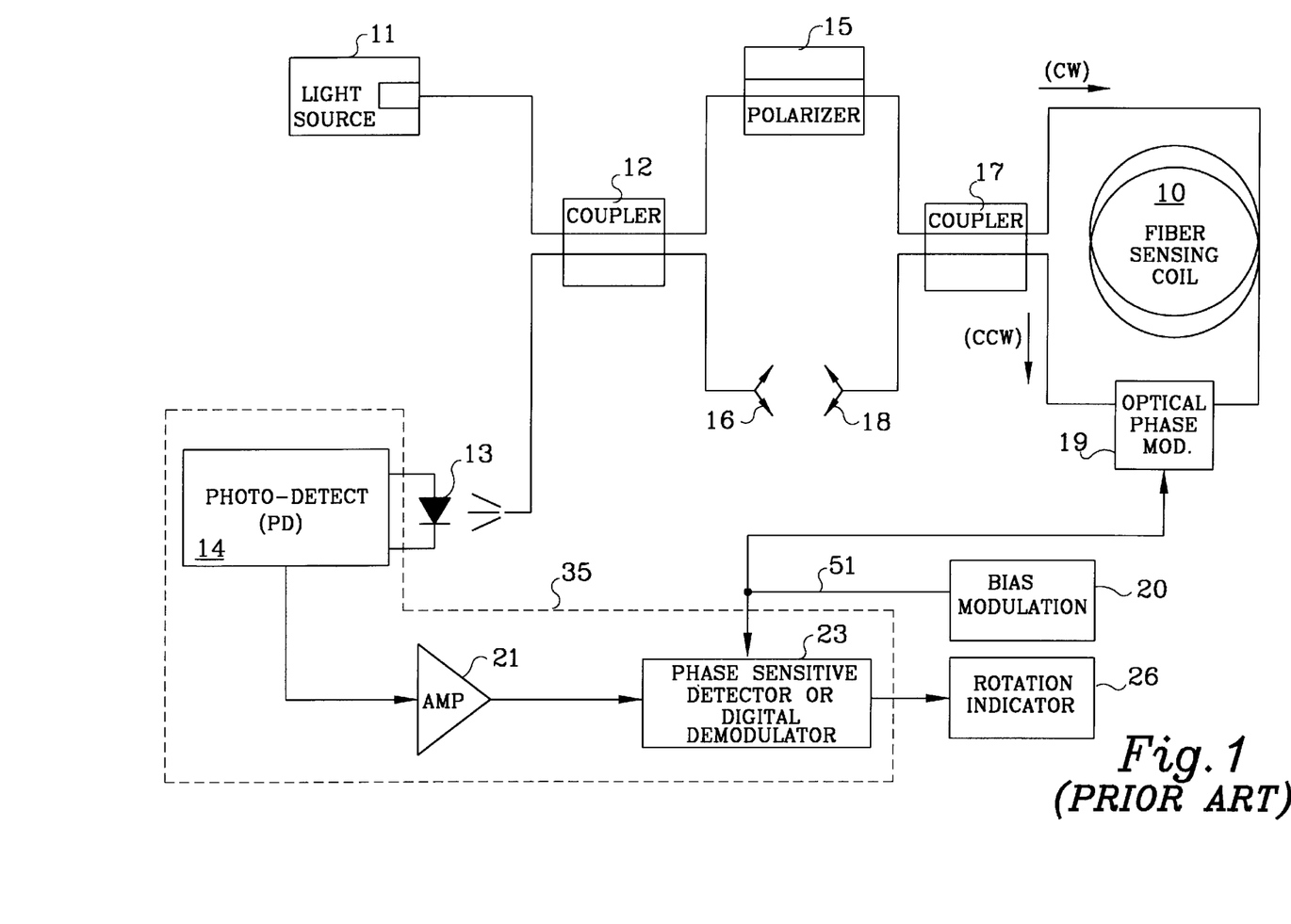
FIG. 1 shows a basic interferometric fiber optic gyroscope.

A fiber optic gyroscope, as shown in FIG. 1, has a coiled optical fiber wound on a core and about the axis thereof around which rotation is to be sensed. The optical fiber is typical of a length of 50 to 2,000 meters, or so, and is part of a closed optical path in which an electromagnetic wave, or light wave, is introduced and split into a pair of such waves to propagate in clockwise (cw) and counterclockwise (ccw) directions through the coil to both ultimately impinge on a photodetector. Rotation $\Omega$ about the sensing axis of the core, or the coiled optical fiber, provides an effective optical path length increase in one rotational direction and an optical path length decrease in the other rotational direction for one of these waves. The opposite result occurs for rotation in the other direction. Such path length differences between the waves introduce a phase shift between these waves for either rotation direction, i.e., the well-known Sagnac effect. This gyroscope is known as the interferometric fiber optic gyro (IFOG). The use of a coiled optical fiber is desirable because the amount of phase difference shift due to rotation, and so the output signal, depends on the length of the entire optical path through the coil traversed by the two electromagnetic waves traveling in opposing directions, and so a large phase difference can be obtained in the long optical fiber but in the relatively small volume taken by it as a result of being coiled.

Figure 2:
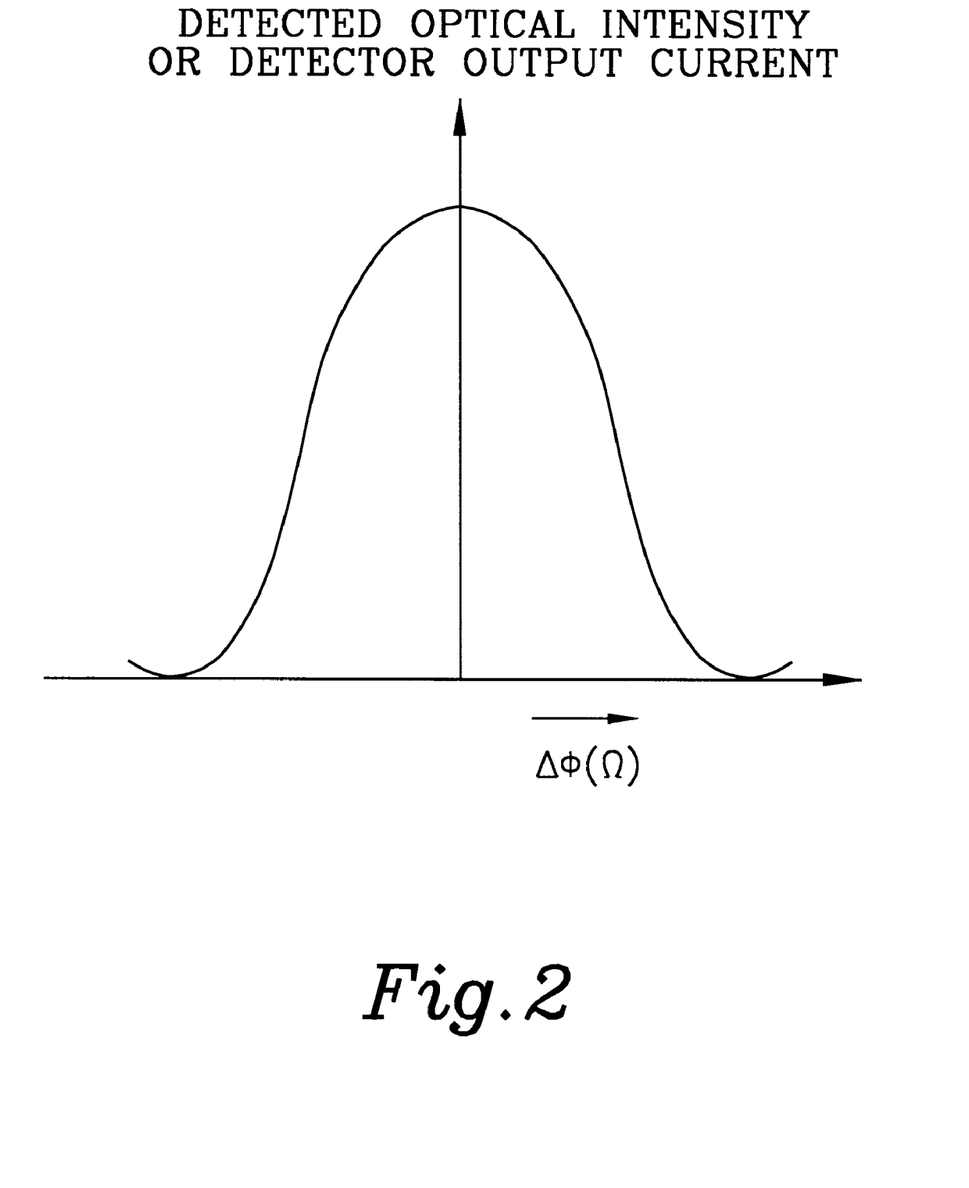
FIG. 2 is a graph of detected optical intensity or output current of a photodetector versus phase difference of counter-propagating light waves in the sensing coil of a fiber optic gyroscope.

The output light intensity impinging on the photodetector and hence the current emanating from the photodetector system photodiode (PD), in response to the opposite direction traveling electromagnetic waves impinging thereon after passing through the coiled optical fiber, follows a raised cosine function. That is, the output current depends on the cosine of the phase difference $\phi(\Omega)$ between these two waves as shown in FIG. 2. Since a cosine function is an even function, such an output function gives no indication as to the relative directions of the phase difference shift, and so no indication as to the direction of the rotation about the coil axis. In addition, the rate of change of a cosine function near zero phase is very small, and so such an output function provides very low sensitivity for low rotation rates.

Because of these unsatisfactory characteristics, the phase difference between the two opposite direction traveling electromagnetic waves is usually modulated by placing an optical phase modulator, or what is sometimes referred to as a bias modulator, in the optical path on one side of or adjacent to one side of the coiled optical fiber. In order to achieve sensitive detection of rotation, the Sagnac interferometer is typically biased at a frequency $f_b$ by a sinusoidal or square wave modulation of the differential phase between the counter-propagating beams within the interferometric loop. As a result, one of these oppositely directed propagating waves passes through the modulator on the way into the coil while the other wave, traversing the coil in the opposite direction, passes through the modulator upon exiting the coil.

In addition, a phase-sensitive detector PSD serving as part of a demodulator system or a digital demodulator is provided to receive a signal representing the photodetector output current. Both the phase modulator and the phase-sensitive detector can be operated by the modulation signal generator or a synchronized derivative thereof at the so-called "proper" frequency to reduce or eliminate modulator induced amplitude modulation.

Figure 3A:
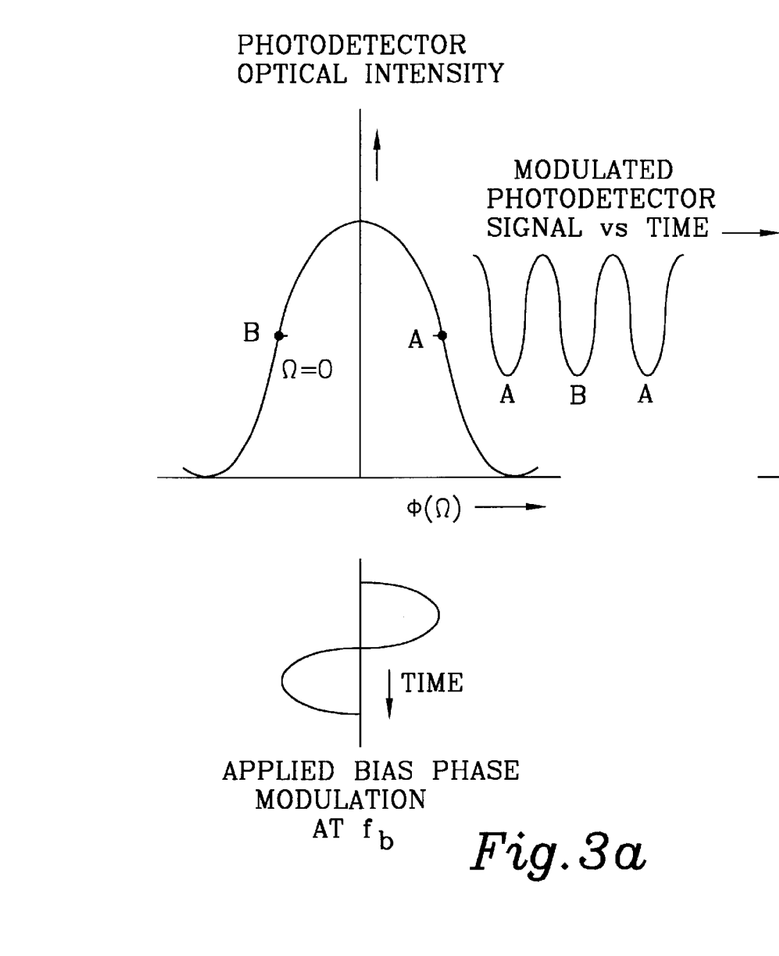
FIGS. 3a and 3b show the phase differences of the optical light waves and outputs of the gyroscope for zero and non-zero rotation rates, respectively.
Figure 3B:
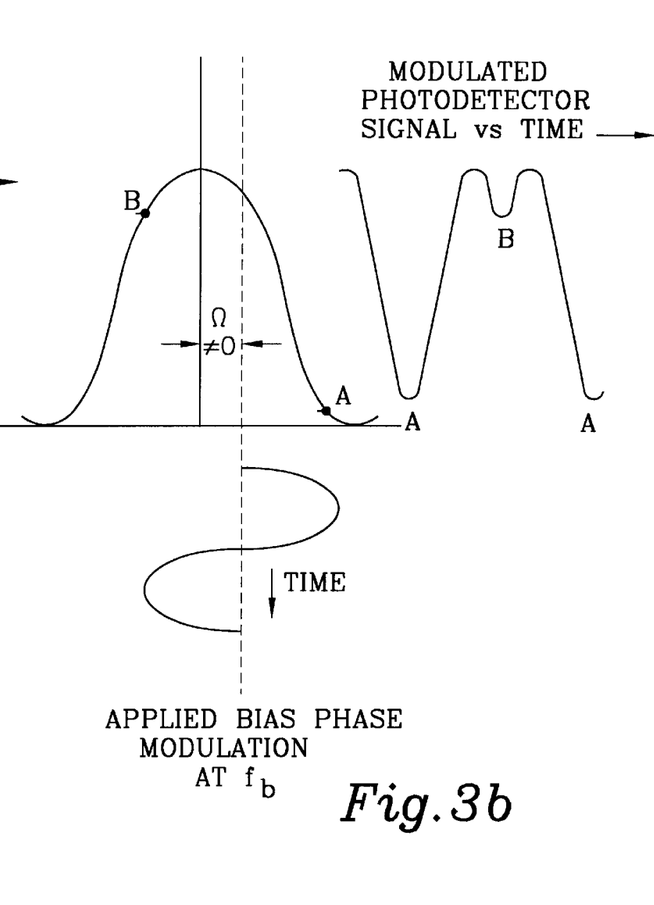

FIGS. 3a, 3b and 4 show the effect of modulation and demodulation over the raised cosine function. In FIGS. 3a and 3b, the phase difference $\Delta\phi$ of the gyro optical waves are modulated with a sine wave bias modulation for the cases of $\Omega=0$ and $\Omega\neq0$ respectively. The resulting modulated intensity output of the photodetector vs time is shown to the right of the raised cosine function. As FIGS. 3a and 3b show, for $\Omega=0$ the phase modulation is applied symmetrically about the center of the raised cosine function and for $\Omega\neq0$ the phase modulation is applied asymmetrically. In the first case, the output is the same when the sensor is biased at point A as when it is biased at point B, giving only even harmonics of $f_b$ on the photodetector output. In the second case, the outputs at A and B are unequal, giving significant photodetector signal content at $f_b$, which is indicative of rotation rate. This signal content at $f_b$, recovered by the phase sensitive demodulator (PSD), is proportional to the rotation rate $\Omega$. The signal also changes sign for an oppositely directed rotation rate.

Figure 4A:
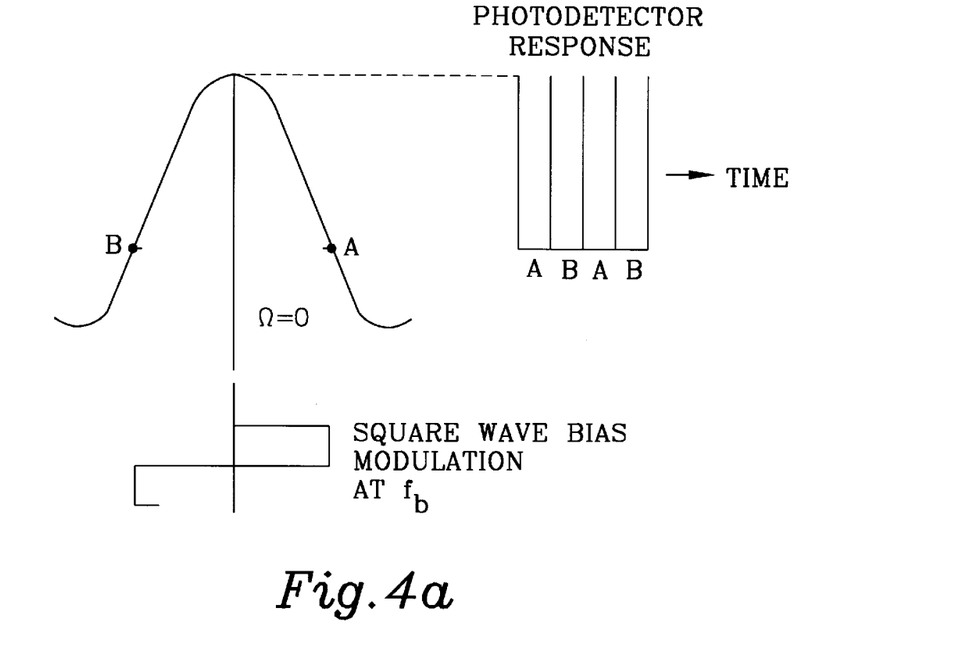
FIGS. 4a and 4b reveal the phase differences of the optical waves and outputs of the gyroscope for zero and non-zero rotation rates, respectively, for square wave modulation.
Figure 4B:
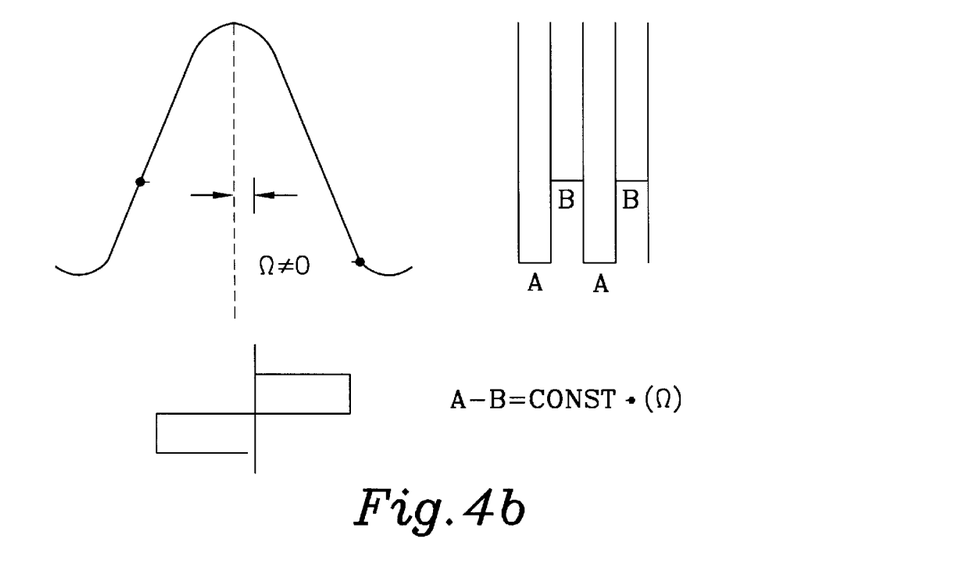
Figure 5A:
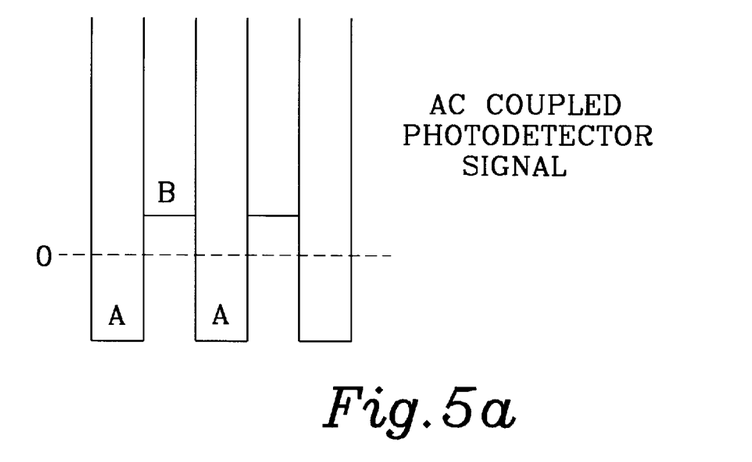
FIGS. 5a, 5b and 5c show signal components synchronous with the bias modulation signal.
Figure 5B:
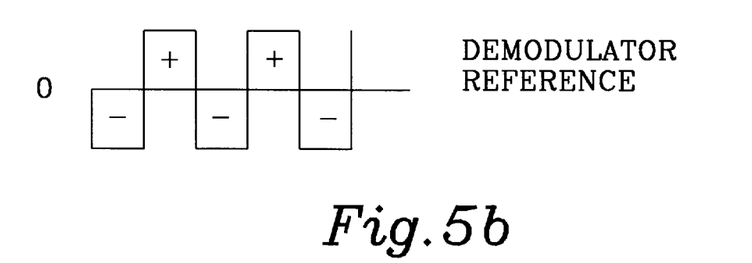
Figure 5C:
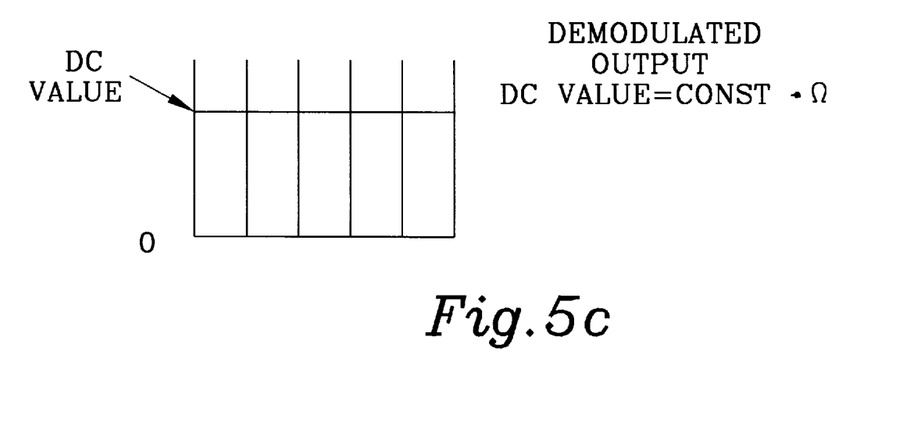

FIGS. 4a and 4b show the case of square wave modulation for $\Omega=0$ and 106 $\neq 0$, respectively. Here, in practice, square wave modulation produces a modulation transients by the value of switching $\Delta\phi$ from point A to point B on the raised cosine function. These are shown by the vertical lines in the resultant modulated photodetector current vs. time, which is proportional to the optical intensity impinging on the photodetector for an ideal photodetector. Again, in the absence of rotation, the output at points A and B are equal, while the presence of rotation makes the output unequal for the "A" half periods and "B" half periods. In the square wave demodulation process depicted in FIGS. 5a, 5b and 5c, the signal component synchronous with the bias modulation frequency $f_b$ is recovered from the photodetector signal by multiplying by a square wave demodulator reference waveform of zero mean, synchronized to the bias modulation. The average, or DC component of the resultant demodulated output is proportional to rotation rate.

Figure 6:
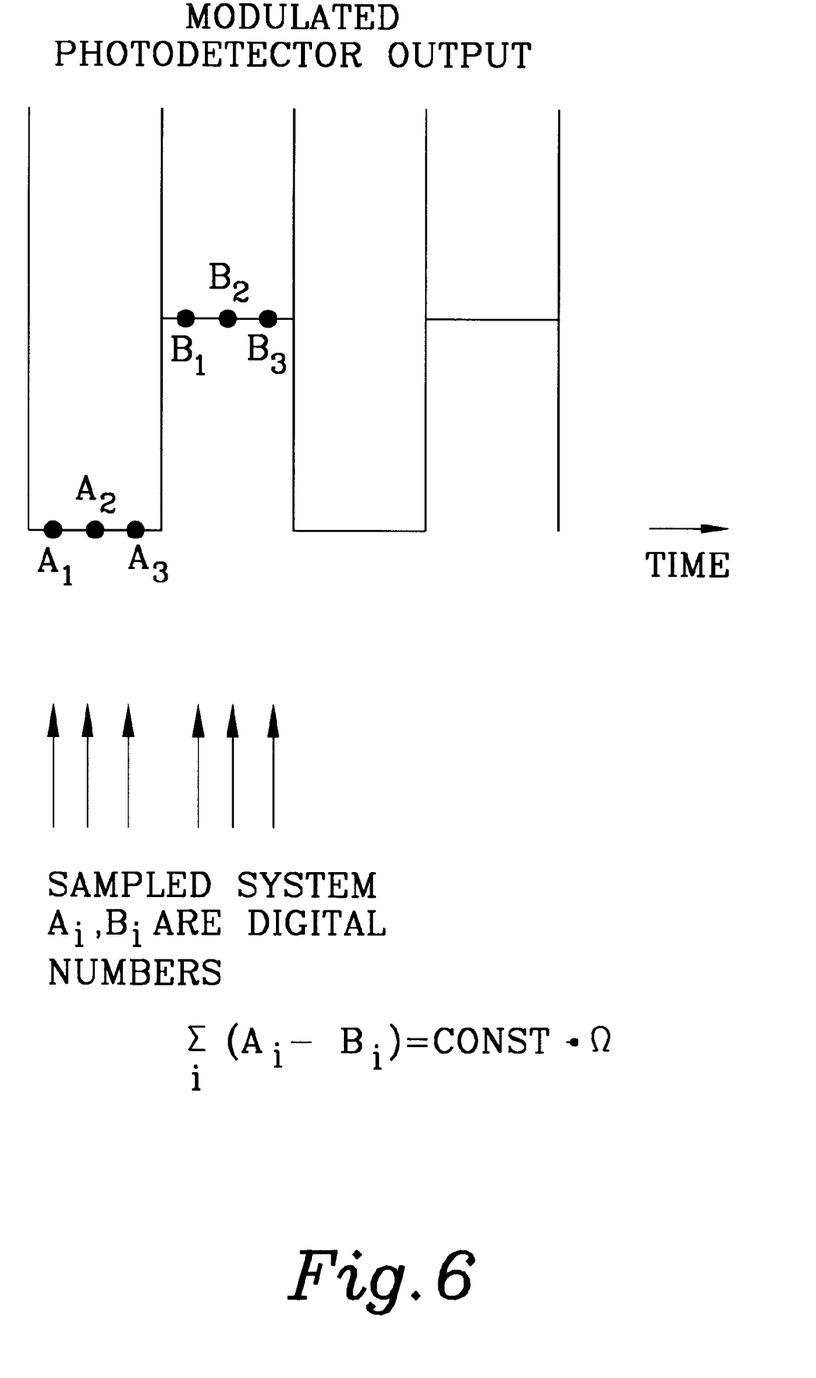
FIG. 6 reveals a sampling scheme for a photodetector output.

One other method of recovering the rotation rate, shown in FIG. 6, is that of a digital demodulation scheme where the output of the photodetector in a square wave modulated system is sampled at points $A_i$ during the first half cycle and points $B_i$ during the second half cycle. The sample event is represented by an arrow. Each sample is converted from an analog signal to a digital one and the difference between the digital sum of the $A_i$'s and the digital sum of the $B_i$'s is proportional to $\Omega$.

In all of these cases, the PSD/digital demodulator output is an odd function having a large rate of change at zero phase shift, and thus changes algebraic sign on either side of zero phase shift. Hence, the phase-sensitive detector PSD/digital demodulator signal can provide an indication of which direction a rotation is occurring about the axis of the coil, and can provide the large rate of change of signal value as a function of the rotation rate near a zero rotation rate, i.e. the detector has a high sensitivity for phase shifts near zero so that its output signal is quite sensitive to low rotation rates. This is possible, of course, only if phase shifts due to other sources, that is, errors, are sufficiently small. In addition, this output signal in these circumstances is close to being linear at relatively low rotation rates. Such characteristics for the output signal of the demodulator/PSD are a substantial improvement over the characteristics of the output current of the photodetector without optical phase modulation.

An example of such a system from the prior art is shown in FIG. 1. The optical portion of the system contains several features along the optical paths to assure that this system is reciprocal, i.e., that substantially identical optical paths occur for each of the opposite direction propagating electromagnetic waves except for the specific introductions of non-reciprocal phase difference shifts, as will be described below. The coiled optical fiber forms a coil 10 about a core or spool using a single mode optical fiber wrapped about the axis around which rotation is to be sensed. The use of a single mode fiber allows the paths of the electromagnetic or light waves to be defined uniquely, and further allows the phase fronts of such a guided wave to also be defined uniquely. This greatly aids maintaining reciprocity.

In addition, the optical fiber can be so-called polarization-maintaining fiber in that a very significant birefringence is constructed in the fiber so that polarization fluctuations introduced by unavoidable mechanical stresses, by the Faraday effect in magnetic fields, or from other sources, which could lead to varying phase difference shifts between the counter-propagating waves, become relatively insignificant. Thus, either the high refractive index axis, i.e., the slower propagation axis, or the low index axis is chosen for propagating the electromagnetic waves depending on the other optical components in the system.

The electromagnetic waves which propagate in opposite directions through coil 10 are provided from an electromagnetic wave source, or light source 11, in FIG. 1. This source is a broadband light source, typically a semiconductor super-luminescent diode or a rare earth doped fiber light source which provides electromagnetic waves, typically in the near-infrared part of the spectrum, over a range of typical wavelengths between 830 nanometers (nm) and 1550 nm. Source 11 must have a short coherence length for emitted light to reduce the phase shift difference errors between these waves due to Rayleigh and Fresnel scattering at scattering sites in coil 10. The broadband source also helps to reduce errors caused by the propagation of light in the wrong state of polarization.

Between light source 11 and fiber optic coil 10 there is shown an optical path arrangement in FIG. 1 formed by the extension of the ends of the optical fiber forming coil 10 to some optical coupling components which separate the overall optical path into several optical path portions. A portion of optical fiber is positioned against light source 11 at a point of optimum light emission therefrom, a point from which it extends to a first optical directional coupler 12 which may also be referred to as a optical light beam coupler or wave combiner and splitter.

Optical directional coupler 12 has light transmission media therein which extend between four ports, two on each end of that media, and which are shown on each end of coupler 12 in FIG. 1. One of these ports has the optical fiber extending from light source 11 positioned thereagainst. At the other port on the sense end of optical directional coupler 12 there is shown a further optical fiber positioned thereagainst which extends to be positioned against a photodiode 13 which is electrically connected to a photodetection system 14.

Photodiode 13 detects electromagnetic waves, or light waves, impinging thereon from the portion of the optical fiber positioned there against and provides a photo current in response to a signal component selection means 35. This photocurrent, as indicated above, in the case of two nearly coherent light waves impinging thereon, follows a raised cosine function in providing a photocurrent output which depends on the cosine of the phase difference between such a pair of substantially coherent light waves. This photodetector device will operate into a very low impedance to provide the photo current which is a linear function of the impinging radiation, and may typically be a p-i-n photodiode.

Optical directional coupler 12 has another optical fiber against a port at the other end thereof which extends to a polarizer 15. At the other port on that same side of coupler 12 there is a non-reflective termination arrangement 16, involving another portion of an optical fiber.

Optical directional coupler 12, in receiving electromagnetic waves, or light, at any port thereof, transmits such light so that approximately half thereof appears at each of the two ports of coupler 12 on the end thereof opposite that end having the incoming port. On the other hand, no such waves or light is transmitted to the port which is on the same end of coupler 12 as is the incoming light port.

Polarizer 15 is used because, even in a single spatial mode fiber, light can propagate in two polarization modes through the fiber. Thus, polarizer 15 is provided for the purpose of passing light propagating of one polarization such that clockwise (cw) and counterclockwise (ccw) waves of the same polarization are introduced into sensing loop 10 and only light from the sensing loop of the same polarization for the cw and ccw waves are interfered at the detector. Polarizer 15, however, does not entirely block light in the one state of polarization that it is intended to block. Again, this leads to a small non-reciprocity between two opposite direction traveling electromagnetic waves passing therethrough and so a small non-reciprocal phase shift difference occurs between them which can vary with the conditions of the environment in which polarizer 15 is placed. In this regard, the high birefringence in the optical fiber used or the broad bandwidth of the light source used again aids in reducing this resulting phase difference, as indicated above.

Polarizer 15 has a port on either end thereof with the electromagnetic wave transmission medium contained therein positioned therebetween. Positioned against the port on the end thereof opposite that connected to optical directional coupler 12 is another optical fiber portion which extends to a further optical bi-directional coupler 17 which has the same wave transmission properties as does coupler 12.

The port on the same end of coupler 17 from which a port is coupled to polarizer 15 again is connected to a non-reflective termination arrangement 18, using a further optical fiber portion. Considering the ports on the other end of coupler 17, one is connected to further optical components in the optical path portions extending thereto from one end of the optical fiber in coil 10. The other port in coupler 17 is directly coupled to the remaining end of optical fiber 10. Between coil 10 and coupler 17, on the side of coil 10 opposite the directly connected side thereof, is provided an optical phase modulator 19. Optical phase modulator 19 has two ports on either end of the transmission media contained therein shown on the opposite ends thereof in FIG. 1. The optical fiber from coil 10 is positioned against a port of modulator 19. The optical fiber extending from coupler 17 is positioned against the other port of modulator 19.

Optical modulator 19 is capable of receiving electrical signals to cause it to introduce a phase difference in electromagnetic waves transmitted therethrough by either changing the index of refraction or the physical length of the transmission medium, thereby changing the optical path length. Such electrical signals are supplied to modulator 19 by a bias modulation signal generator 20 providing either a sinusoidal voltage output signal at a modulation frequency $f_b$ that is intended to be equal to $C_1 \sin(\omega_b t)$ where $\omega_b$ is the radian frequency equivalent of the modulation frequency $f_b$, or a square wave modulation signal at $f_b$. and $C_1$ is the amplitude of the modulation. Other suitable periodic waveforms could alternatively be used.

This completes the description of the optical portion of the system of FIG. 1 formed along the optical path followed by the electromagnetic waves, or light waves, emitted by source 11. Such electromagnetic waves are coupled from that source 11 through the optical fiber portion to optical directional coupler 12. Some of such wave entering coupler 12 from source 11 is lost in non-reflecting terminating arrangement 16 coupled to a port on the opposite end thereof, but the rest of that wave is transmitted through polarizer 15 to optical directional coupler 17.

Coupler 17 serves as a beam-splitting apparatus in which electromagnetic waves entering the port thereof, received from polarizer 15, split approximately in half with one portion thereof passing out of each of the two ports on the opposite ends thereof. Out of one port on the opposite end of coupler 17 an electromagnetic wave passes through optical fiber coil 10, modulator 19, and back to coupler 17. There, a portion of this returning wave is lost in non-reflective arrangement 18 connected to the other port on the polarizer 15 connection end of coupler 17, but the rest of that wave passes through the other port of coupler 17 to polarizer 15 and to coupler 12 where a portion of it is transmitted to photodiode 13. The other part of the wave passed from polarizer 15 to coil 10 leaves the other port on the coil 10 end of coupler 17, passes through modulator 19, and optical fiber coil 10 to re-enter coupler 17 and, again, with a portion thereof following the same path as the other portion to finally impinge on photodiode 13.

As indicated above, photodiode 13 provides an output photocurrent i proportional to the intensity of the two electromagnetic waves or light waves impinging thereon, and is therefore expected to follow the cosine of the phase difference between these two waves impinging on that diode. For sinusoidal bias modulation, the photodiode signal is given by the following equation:

$$i = \frac{I_o}{2}\eta[1 + \cos(\phi_R + \phi_b \cos\omega_b t)] \quad (1)$$

where $I_o$ is the light intensity magnitude at photodetector 13 in the absence of any phase difference between counterclockwise waves and $\eta$ is the detector responsivity coefficient. This is because the current depends on the resulting optical intensity of the two substantially coherent waves incident on photodiode 13, an intensity which will vary from a peak value of $I_o$ to a smaller value depending on how much constructive or destructive interference occurs between the two waves. This interference of waves will change with rotation of the coiled optical fiber forming coil 10 about its axis as such rotation introduces a phase difference shift of $\phi_R$ between the waves. Further, there is an additional variable phase shift introduced in this photodiode output current by modulator 19 with an amplitude value of $\phi_b$ and which is intended to vary as $\cos(\omega_b t)$.

For the case of square wave modulation, the photodiode current is represented by $$i = \frac{1}{2}\eta I_o[1 + \cos(\phi_R + \phi_b)] \quad (2)$$

where the amplitude of the phase difference modulation is $$\phi_b = \begin{cases} |\phi_b| & nT \leq t < \left(n + \frac{1}{2}\right)T \\ -|\phi_b| & \left(n + \frac{1}{2}\right)T \leq t < (n+1)T \end{cases} \quad (3)$$

where n=0, 1, 2, 3 . . . , and where T is the bias modulation period. Optical phase modulator 19 is of the kind described above and is used in conjunction with a PSD or digital demodulator 23 as part of an overall detection 10 system for converting the output signal of photodetection system 14, following a cosine function as indicated above, to a signal function that provides in that output signal, as indicated above, information both as to the rate of rotation and the direction of that rotation about the axis of coil 10.

Thus, the output signal from photodetection system 14, including photodiode 13, is converted to a voltage and provided through an amplifier 21, where it is amplified and passed to PSD/digital demodulator means 23. Photodetection system 14, amplifier 21, filter 22 and PSD/digital demodulator 23 constitute signal component selection means 35. PSD/digital demodulator 23, serving as part of a phase demodulation system, is a well known device. Such a PSD/digital demodulator 23 extracts the amplitude of the fundamental frequency $f_b$ of the photodiode 13 output signal, or the fundamental frequency of modulation signal generator 20 plus higher odd harmonics, to provide an indication of the relative phase of the electromagnetic waves impinging on photodiode 13. This information is provided by PSD/digital demodulator 23.

Bias modulator signal generator 20, in modulating the light in the optical path at the frequency $f_b$ described above, also leads to harmonic components being generated by the recombined electromagnetic waves in photodetection system 14.

In operation, the phase difference changes in the two opposite direction propagating electromagnetic waves passing through coil 10 in the optical path, because of rotation, will vary relatively slowly compared with the phase difference changes due to modulator 19. Any phase differences due to rotation, or the Sagnac effect, will merely shift the phase differences between the two electromagnetic waves. The amplitude of the modulation frequency component of the output signal of photodetection system 14, is expected to be set by the magnitude of this phase difference modified further only by the factors of a) the amplitude value of the phase modulation of these waves due to modulator 19 and generator 20, and b) a constant representing the various gains through the system. Then, the periodic effects of this sinusoidal modulation due to generator 20 and modulator 19 in this signal component are expected to be removed by demodulation in the system containing PSD/digital demodulator 23 leaving a demodulator system (detector) output signal depending on just the amplitude scaling factor thereof.

Thus, the voltage at the output of amplifier 21 will typically appear as:

$$V_{21-out} = \tfrac{1}{2} I_o \eta k \{1 + \cos[\phi_R + \phi_b \cos(\omega_b t + \theta)]\} \quad (4)$$

for sine wave modulation. The constant k represents the gains through the system to the output of amplifier 21. The symbol $\theta$ represents additional phase delay in the output signal of amplifier 21 at $\omega_b$ with respect to the phase of the signal at $\omega_b$ on the photocurrent. This phase shift is thus introduced in photodetection system 14. The other symbols used in the preceding equation have the same meaning as they did in the first equation above.

The foregoing equation can be expanded in a Bessel series expansion to give the following:

$$V_{21-out} = \tfrac{1}{2} I_o \eta k \Big\{ [1 + J_0(\varphi_b)\cos\varphi_R] - 2J_1(\varphi_b)\sin\varphi_R \cos(\omega_b t + \theta) - \quad (5)$$
$$2J_2(\varphi_b)\cos\varphi_R \cos2(\omega_b t + \theta) + 2J_3(\varphi_b)\sin\varphi_R \cos3(\omega_b t + \theta) +$$
$$\sum_{n=2}^{\infty}[(-1)^n 2J_{2n}(\varphi_b)\cos\varphi_R \cos2n(\omega_b t + \theta) -$$
$$(-1)^n 2kJ_{2n+1}(\varphi_b)\sin\varphi_R \cos(2n+1)(\omega_b t + \theta)]\Big\}.$$

This signal at the output of amplifier 21 is applied to the input of PSD 23, as is the signal from bias modulator generator 20, the latter again intended to be equal to $C_1 \sin(\omega_b t)$ where $\omega_b$ is the radian frequency equivalent of the modulation frequency $f_b$. Assuming that PSD 23 picks out only the signal of interest at $\omega_b$, the output of that detector with such a generator 20 output signal will then be the following:

$$V_{23-out} = I_o \eta k' J_1(\phi_b) \sin \phi_R. \quad (6)$$

The constant k' accounts for the system gains from photodetector 13 output current through PSD/digital demodulator 23.

A similar result is obtained for square wave bias modulation where the photocurrent is $$i = \begin{cases} \tfrac{1}{2} I_o \eta [1 + \cos\phi_R \cos|\Delta\phi_b| - \sin\phi_R \sin|\Delta\phi_b|] & t_1 \leq t < t_2 \\ \tfrac{1}{2} I_o \eta [1 + \cos\phi_R \cos|\Delta\phi_b| + \sin\phi_R \sin|\Delta\phi_b|] & t_2 \leq t < t_3 \end{cases} \quad (7)$$

where
$t_1 = nT$
$t_2 = (n+\tfrac{1}{2})T$
$t_3 = (n+1)T$
and
$n = 0, 1, 2, \ldots$
and the output of PSD 23 will be $$V_{23-out} = K'' I_o \eta \sin \phi_R \sin |\Delta\phi_b| \quad (8)$$

where K" is a constant of proportionality that includes the amplifier gains between the photodetector 14 current output and the PSD 23 output.

As can be seen from these equations, the output of PSD/digital demodulator 23 depends on the rotation rate.

However, there may be error terms that may prevent the device from achieving the expected results in the system of FIG. 1. One reason for failing to achieve the expected results is that bias modulation signal generator 20, in modulating the light in the optical path at frequency $f_b$ as described above through phase modulator 19, not only results in harmonic components being generated in photodetection system 14 by the recombined electromagnetic waves, but also directly supplies some harmonic components in the varying optical path phase because of non-linearities occurring both in generator 20 and modulator 19.

That is, as a first possibility, the output signal supplied by modulation generator 20 at its output may contain not only a fundamental signal at frequency $f_b$, but also significant harmonics thereof. Even if a signal free of such harmonics could be provided, nonlinear component characteristics and hysteresis in phase modulator 19 can result in introducing such harmonics into the varying phase provided thereby in the optical path. Such harmonics can lead to significant rate bias errors in the output signal of the fiber optic gyroscope. Thus, there is desired an interferometric fiber optic gyroscope in which such errors due to the modulation system are reduced or eliminated.

The "proper" frequency is selected to be that frequency which results in the modulating of one of the waves 180 degrees out of phase with the modulation of the other. This modulation providing 180 degrees of phase difference between the two waves has the effect of eliminating modulator induced amplitude modulation of the resulting photodetector signal. The value of the "proper" frequency can be determined from the length of the optical fiber and the equivalent refractive index therefor.

The resulting signal output of PSD 23 follows a sine function, i.e. the output signal depends on the sine of the phase difference between the two electromagnetic waves impinging on the photodiode 13, primarily the phase shift due to rotation about the axis of the coil 10. A sine function is an odd function having its maximum rate of change at zero, and so changes algebraic sign on either side of zero. Hence, the phase sensitive demodulator signal can provide both an indication of which direction a rotation is occurring about the axis of coil 10, and can provide the maximum rate of change of signal value as a function of rotation rate near a zero rotation rate, i.e., has its maximum sensitivity near zero phase shifts, so that its output signal is quite sensitive to low rotation rates. This is possible, of course, only if phase shifts due to other sources, that is, errors, are made sufficiently small. In addition, this output signal in these circumstances is very close to being linear at relatively low rotation rates. Such characteristics for the output signal of the phase sensitive demodulator 23 are a substantial improvement over the characteristics of the output current of photodetector 14.

Nevertheless, the phase sensitive demodulator 23 output, in following a sine function, results in an output that at rotation rates further from zero, is less and less linear. The output does not become linear again until large enough rotation rates are encountered that give optical phase difference shifts of $\phi_R = \pm m\pi$, where m is an integer. In fact, the output of demodulator 23 is zero at $\phi_R = 0$ or $\phi_R = \pm m\pi$ and linear in regions close to these values. There is a strong desire to operate the gyroscope at a null, thereby gaining a gyro scale factor that is independent of the output signal size, gains of the electronics and having phase sensitive demodulator 23 stay within its linear operation region near its null condition.

This can be accomplished by adding a further phase modulator 19, or frequency shifter, near the end of the coil 10 in an optical path portion used by the opposite direction traveling electromagnetic waves propagating through the coiled optical fiber 10 to reach the photodetector 13. This phase modulator 19, or frequency shifter, is operated in a feedback loop from the photodetector system 14, i.e., the so-called rate loop, and provides sufficient negative feedback such that phase modulator 19 introduced phase change $\phi_f$ is just enough to cancel the phase shift difference between the opposite traveling direction electromagnetic waves resulting from a rotation about the axis of the coiled optical fiber 10 or enough such that $\phi_f = -\phi_R \pm m\ \pi$.

The resultant photodetector 13 current in such a closed loop system can now be represented as $$i = \frac{I_o \eta}{2}[1 + \cos(\phi_R + \phi_f + \phi_b \cos\omega_b t)] \quad (9)$$

for the sine-wave modulated system, and hence if $\phi_f = -\phi_R \pm m\ \pi$, then it can be shown that $V_{23\text{-}out} = 0$. Likewise, in the case of square wave demodulation $$i = \begin{cases} \frac{1}{2}I_o\eta[1 + \cos(\phi_R + \phi_f)\cos|\phi_b| - \sin(\phi_R + \phi_f)\sin|\phi_b|] & t_1 \le t < t_2 \\ \frac{1}{2}I_o\eta[1 + \cos(\phi_R + \phi_f)\cos|\phi_b| + \sin(\phi_R + \phi_f)\sin|\phi_b|] & t_2 \le t < t_3 \end{cases} \quad (10)$$

and $V_{23\text{-}out} = 0$
when the closed loop system adjusts $\phi_f = -\phi_R \pm m\ \pi$.

As a result of the rate loop, there will be little net average phase shift $\phi_N = \phi_f + \phi_R$ from $0 \pm m\ \pi$ occurring at photodetector 13 except for transient rotation rate changes, and so little net average phase shift sensed by phase sensitive demodulator 23. Thus, the DC-averaged output signal of this phase sensitive demodulator 23 will always be near to, or at, zero. This is true, because the feedback gain of a typical servo loop is extremely high near frequencies close to zero. The signal from a generator 20 connected to phase sensitive demodulator 23 for operating this additional phase modulator 19, through providing a signal directing the modulator to provide a particular phase shift sufficient to cancel the phase shift due to rotation or make $\phi_{f=-\phi R} \pm m\ \pi$ will thus contain within it or a related signal the information as to the magnitude and direction of the rotation rate and the value of m.

Several forms for the output signal from the generator 20 connected to phase sensitive demodulator 23 in the rate feedback loop have been suggested for operating this additional optical phase modulator 19. One common and good choice is to use a serrodyne generator which applies a sawtooth-like signal to optical phase modulator 19. A sawtooth or sawtooth-like signal is chosen because it can be shown that an ideal sawtooth signal of $2\pi$ phase amplitude provides what amounts to a pure frequency translation for the modulated electromagnetic waves, a single-sideband modulator. As a result, light passing through the phase modulator being operated with such a sawtooth signal will leave modulator 19 with its frequency translated by an amount equal to the frequency of the sawtooth signal. A non-ideal sawtooth signal will not result in pure frequency translation; rather, added harmonics will be generated that can be kept small by providing very nearly an ideal sawtooth waveform of $2\pi$ amplitude and by careful design of the modulator.

Another type of modulation waveform is called a dual ramp waveform that consists of a linear ramp of positive slope followed by a ramp of negative slope. In this case, the feedback loop alternately locks to $\phi_N = -\pi$ and $\phi_N = +\pi$ or more generally to $\phi_N = m\ \pi$ and $\phi_N = (m+2)\pi$. In the absence of rotation, the slope magnitudes of the up-ramp and the down-ramp are equal. In the presence of rotation, the slope magnitudes are different with the magnitude of the difference in slopes between the two ramps being proportional to the rotation rate magnitude. Which ramp, the up-ramp or the down-ramp, has the greater slope magnitude is an indication of rotational directions. This technique has the performance advantage that there is no fast fly-back required in the phase shifter voltage as is the case with the serrodyne waveform.

The following discussion will assume the use of serrodyne feedback modulation for the purposes of illustration, but dual ramp or other modulation schemes could be used as well. In addition, it is recognized that the bias modulation and the feedback ramp may be added together and applied to a single or multiple phase modulators.

Since optical phase modulator 19 so operated will be on one side of the coiled optical fiber 10, one of the electromagnetic waves will have its frequency translated upon entering coil 10 while the other will not have its frequency translated until it exits the coil. Hence, one wave traverses the loop having a higher frequency than the other (though both have the same frequency on reaching the photodetector) with the result that, for a fixed modulator (or serrodyne generator) frequency, one will have a phase shift with respect to the other at photodetector 13 in an amount set by the frequency of the sawtooth and the optical length of the fiber of $2\pi\tau\Delta f$. Here, $\Delta f$ is the modulator 20 or generator frequency, and $\tau$ is the transit time of the light waves through the coil. This phase shift will act to counter the phase shift between the light waves, caused by rotation, because of the negative feedback loop in which the modulator is provided. Thus, the frequency of the sawtooth, or sawtooth-like generator output signal will be an indication of the rotation rate, and the polarity of the sawtooth will indicate the direction of rotation.

Figure 7:
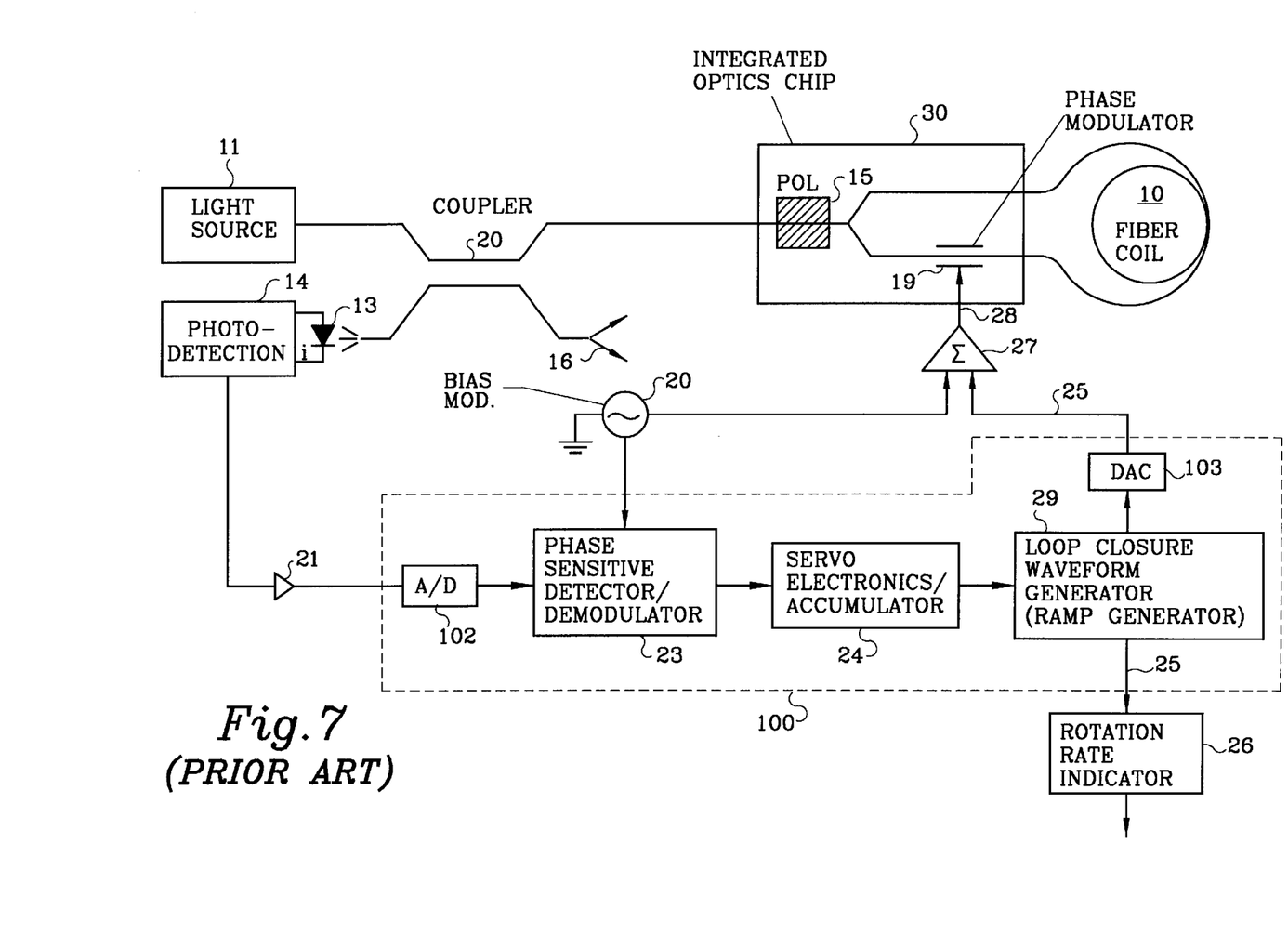
FIG. 7 shows an interferometric fiber optic gyroscope having a rate feedback loop.

One example of a rate feedback loop 100 is shown in FIG. 7. Rather than to the rotation rate indicator of FIG. 1, the signal from phase sensitive detector (also referred to as a demodulator) 23 goes to servo electronics 24 which is incorporated in FIG. 7. Servo electronics 24 incorporate an accumulator such as an integrator. In response to such phase difference, servo electronics 24 outputs a phase ramp signal 25 provided by a loop closure waveform generator (also referred to as a ramp generator) 29 that supplies the phase ramp to modulator 19 in the form of signal 28 to phase-shift one beam relative to the other beam so as to bring the beams in phase with each other. A signal either from the servo electronics 24 or loop closure waveform generator 29 contains the magnitude and sign of the phase difference between optical waves. Summing amplifier 27 also supplies in signal 28 the bias modulation signal to this phase modulator 19. The feedback signal required to return beams into phase, such as the frequency of the sawtooth in the serrodyne modulation case, is an indication of the rate of rotation of sensing loop. In digital implementations of the feedback circuitry 100, an analog-to-digital converter 102 is utilized to convert the analog output of the photodetector into a digital equivalent. A digital-to-analog converter (DAC) 103 is also utilized to convert the digital signals output from the ramp generator into analog equivalents that can be received by the modulator.

In this closed loop case the modulator of choice is typically a phase modulator 19 on an integrated optic chip (IOC) 30 shown in FIG. 7 in order to accommodate the necessary high frequency content of the desired phase ramp signal which may be a sawtooth or a dual-ramp-type triangular wave. The signal 25, indicative of rotation, is then supplied to a rotation rate indicator 26 which provides a convenient and readily useful indication of rotation rate of loop. In the case of employing a phase modulator 19 on an integrated optical chip (IOC) 30 it is also convenient to implement coupler function 17 of FIG. 1 as a y-junction 31 on the IOC and to implement the polarizer 15 on the IOC chip or construct the IOC waveguides using a single polarization design. Y-junction 31 may be regarded as an optical lightwave or beam splitter/combiner, like that as of coupler 12.

Figure 8A:
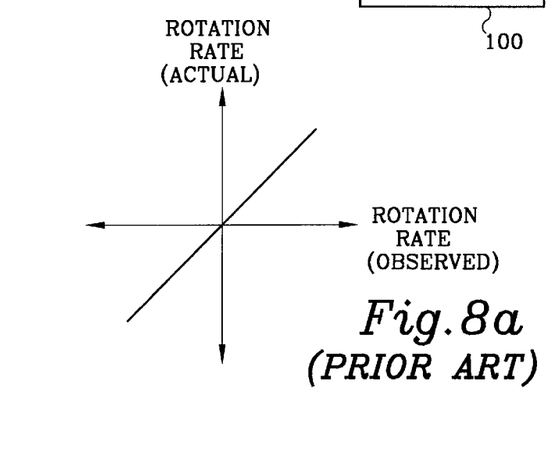
FIGS. 8a and 8b show observed rotation rates for ideal and actual fiber optic gyroscopes, respectively.
Figure 8B:
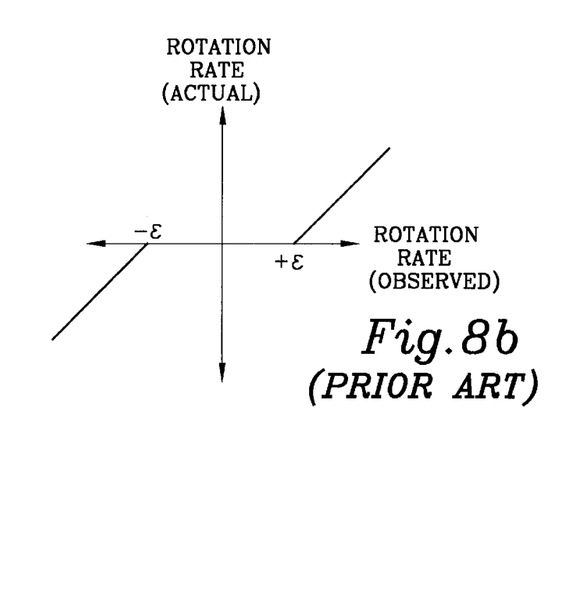

In general, there may be reasons why the fiber optic gyro does not give the expected rotation sensing accuracy. An ideal gyroscope would produce output as shown in FIG. 8a, with observed rotation rate corresponding linearly with actual rotation rate. In practice, however, gyroscopes have difficulty in measuring very low rotation rates, and actual output typically corresponds to FIG. 8b. As can be readily observed, the gyroscope is less sensitive to rotation rates near zero degrees plus or minus some value ($\epsilon$). This region of zero rotation rate$\pm\epsilon$ is referred to as a "deadband" or "dead zone" over which inaccurate output will occur. Deadband regions about the zero rate of$\pm$10 degrees per hour have been observed.

Figure 9:
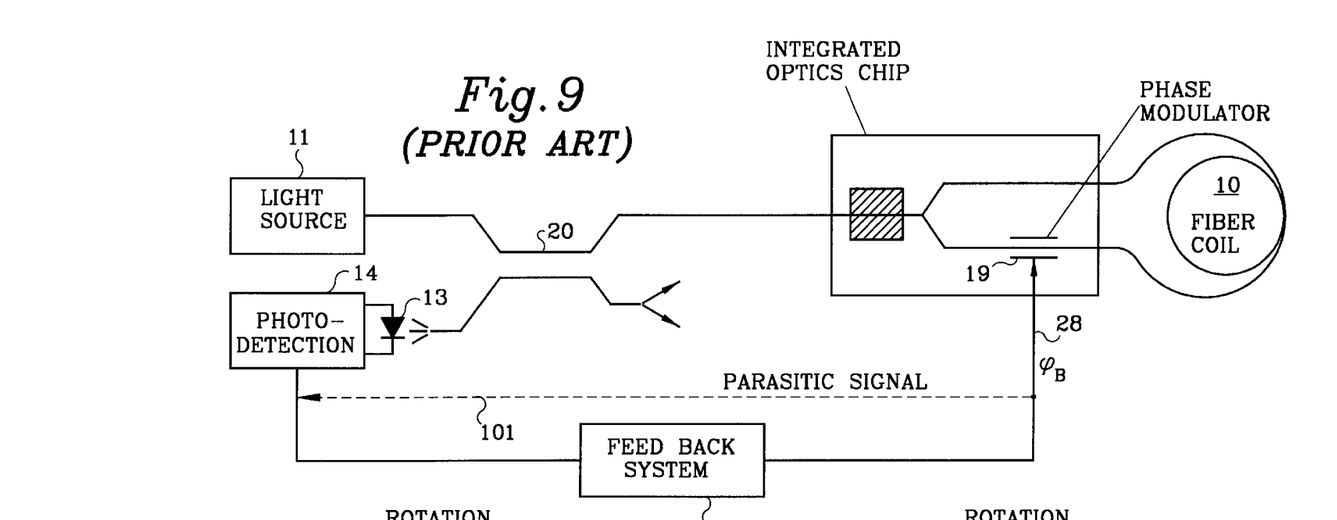
FIG. 9 reveals the parasitic signal that causes deadband errors.

Deadband errors may occur for a number of reasons. A primary cause, however, is parasitic coupling across the feedback circuitry. As shown by the dotted line in FIG. 9, a parasitic signal 101 may be transmitted across the feedback circuit 100 resulting in unwanted deadband effects. This signal may result from layout of the electronic components on a circuit board, and therefore the strength of the signal varies according to particular gyro implementation. As this parasitic signal 100 is provided to the input of the accumulator in the feedback circuit 101, it will affect the accumulator and may prevent the accumulator from properly ramping, even when the gyro is rotating slightly. The bias signal provided to the phase modulator will be affected and the gyro will be prevented from observing small rotation rates. Accordingly, it is desirable to produce a fiber optic gyroscope exhibiting minimal deadband error.

SUMMARY OF THE INVENTION

It is an object of the present invention to provide a fiber optic gyroscope that is capable of sensing rotation rates that are very close to zero.

It is another object of this invention to provide deadband error reduction including an offset modulation that can be easily and effectively implemented in a fiber optic gyroscope.

It is a still further object of this invention to reduce the high-frequency components of the offset modulation to reduce destabilization in the control loop.

It is yet another object of this invention to provide an adaptive, non-zero mean to the offset modulation to further compensate for deadband effects.

According to this invention, there is provided an offset phase modulation to the phase modulator having an amplitude of a predetermined value. In the preferred embodiment of the invention, the offset modulation exhibits a triangle or sawtooth waveform and has an amplitude equal to an integer multiple of $2\pi$.

In all embodiments of the invention, an offset phase modulation is applied at the phase modulator to average the deadband-producing error across the feedback modulation signal. The offset phase modulation may take any of several waveforms, but in all cases the amplitude must be selected to correspond with the period of the bias signal. If the offset modulation follows a waveform that is linear with time (such as a triangular waveform), then the magnitude of the offset modulation will be $2\pi$. This offset modulation produces an indication of a coil rotation in the gyro, effectively moving the gyro out of the deadband region where proper rotation measurement can be observed. Of course, the output of the gyroscope must be compensated for the imposed change in rotation rate.

Gyroscopes according to the present invention exhibit remarkable advantages over those known in the prior art. Most notably, they significantly reduce deadband regions of decreased responsiveness. The above and other objects, features, and advantages of the present invention will become apparent from the following detailed description of illustrative embodiments thereof to be read in conjunction with the accompanying drawings, in which like reference numerals are used to identify the same or similar parts in the similar views.

DESCRIPTION OF THE EMBODIMENTS

Because the parasitic signal that creates deadband errors is derived from the feedback signal provided to the phase modulator, the resulting deadband will be related to the periodic feedback signal. It is therefore desirable to modulate the feedback signal provided to the phase modulator such that the total error due to the parasitic signal averages to zero. When the offset modulation is triangular, sawtoothed or otherwise linear with time, it is observed that the bias of the gyro cycles through one period as the signal input to the phase modulator changes by $2\pi$. Put another way, by dithering the input to the phase modulator by a linear waveform having a magnitude of $2\pi$, the feedback signal from the feedback loop averages very quickly. This averaging effectively compensates for the parasitic signal in the feedback circuit and reduces deadband error significantly.

Other offset modulation waveforms may complement the error waveform so as to effectively achieve the error reduction of an offset modulation waveform of linear segments and $2\pi$ amplitude. For example, sinusoidal waveforms may be used, but would require an amplitude of a different value. It is important to note that the implemented amplitude need not be exactly equal to the specified value. For example, if the specified value is $2\pi$, a value that approximates $2\pi$ could also be used. Amplitudes that are close to specified value, however, will provide better deadband error compensation than amplitudes further away from the specified value. In this sense, the specified value is an optimal value that may be approximated in practice.

The first part of this invention relates to reduction of deadband errors through the addition of an offset modulation signal $\phi_{OM}$ having the specific amplitude discussed above to the phase modulator. In all embodiments of the present invention, the offset modulation $\phi_{OM}$ exhibits the specified amplitude (e.g. $2\pi$ for waveforms with linear segments) at the phase modulator. Even though the signal may be introduced at various locations in the loop, the signal must be adjusted to produce the specified amplitude at the phase modulator and not at the point of introduction.

Figure 10:
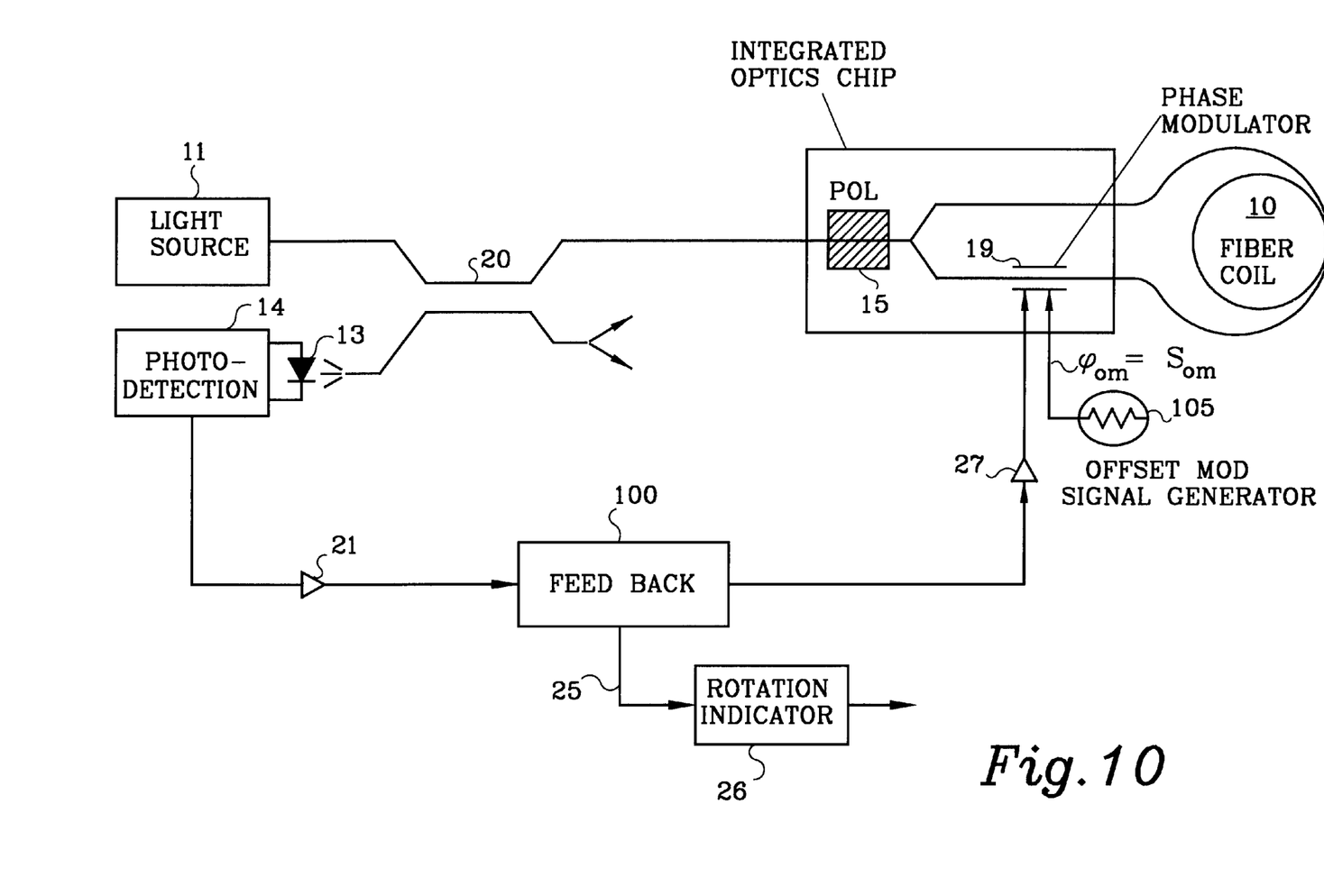
FIG. 10 is a schematic of a first implementation of a fiber optic gyroscope having deadband error compensation.

Referring now to FIG. 10, a fiber optic gyroscope similar to the prior art gyroscope of FIG. 7 is shown. Light emanating from a light source 11 passes through the first coupler 15 and a polarizer to a second coupler, where the light is split into two counter-rotating beams circulating in a sensing coil 10. A phase modulator 19 is provided at one end of the sensing coil 10. As in the prior art, the polarizer 15, second coupler, and phase modulator may be combined on a single integrated optics chip (IOC) as shown in FIG. 10. The phase difference between the two counter-rotating beams is observed by the photodiode 13 and translated into an electrical signal by the photodetector 14. This signal may be amplified by optional amplifier 21 before being processed by feedback circuitry 100. Feedback circuit 100 produces a feedback signal that may be amplified by optional amplifier 27 and provided to the phase modulator 19. Feedback circuitry 100 also provides an output 25 that corresponds to the rotation rate of the sensing coil. This output may optionally be processed by rotation indicator 26.

FIG. 10 also shows a signal generator 105 connected to phase modulator 19. This signal generator 105 provides the offset modulation signal $\phi_{OM}$ having the critical amplitude as discussed above. In the preferred mode of operation, this offset modulation signal $\phi_{OM}$ is a waveform with linear segments and an amplitude of $2\pi$. In the embodiment shown in FIG. 10, this waveform is generated directly by the signal generator and provided directly to the phase modulator.

Figure 11A:
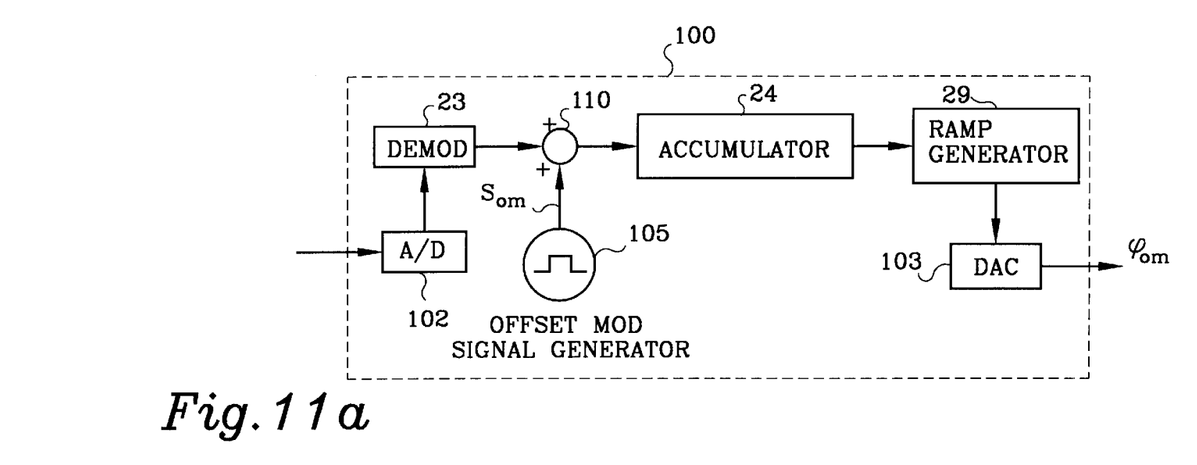
FIG. 11a and 11b are schematics of feedback circuitry used in second and third implementations of a fiber optic gyroscope having deadband error compensation, respectively.
Figure 11B:
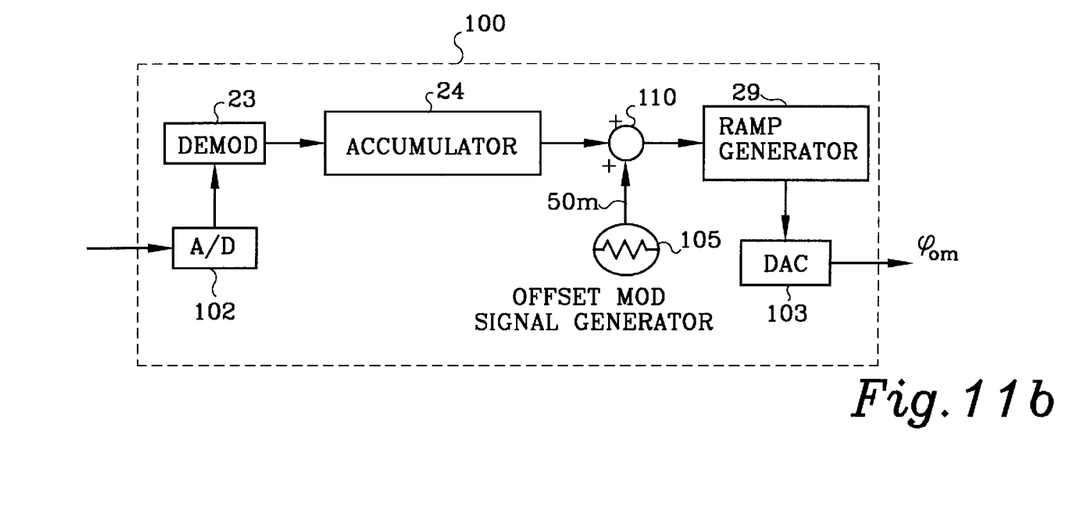

In the second and third embodiments of the invention, the critical value of the offset modulation signal $\phi_{OM}$ is still measured at the phase modulator 19. The signal is introduced, however, in the feedback circuit as shown in FIGS. 11a and 11b. In each of these figures, a feedback circuit that can be implemented into the prior art gyroscope of FIG. 7 is disclosed. In FIGS. 11a and 11b, a feedback circuit 100 including a demodulator 23, an accumulator (such as an integrator) 24 and a ramp generator 29 is disclosed. In a digital implementation, an analog-to-digital converter 102 and a digital-to-analog converter 103 is also included in the feedback circuit. These converters, however, are optional and may be eliminated if only analog components are used in feedback circuit 100.

Referring now to FIG. 11a, a summing junction 110 is introduced into the feedback circuit 100 between the demodulator 23 and the accumulator 24. This summing junction accepts a signal $S_{OM}$ from the offset modulation source signal generator 105, adds signal $S_{OM}$ to the output of demodulator 23, and provides the result to accumulator 24. As stated above, signal $S_{OM}$ is not an equivalent of offset modulation signal $\phi_{OM}$. Rather, $S_{OM}$ is a signal selected to generate a desired offset modulation signal $\phi_{OM}$. If $\phi_{OM}$ is desired to be a triangular waveform having an amplitude of $2\pi$, for example, $S_{OM}$ will be a square wave having an amplitude determined by the particular characteristics of the detected power, the front-end gain (element 21 in FIG. 7) and the demodulator 23. A square wave is necessary, in this case, since accumulator 24 will produce a square wave signal that ramp generator 29 integrates to produce a triangular waveform.

Referring now to a third embodiment of the present invention shown in FIG. 11b, the summing junction 110 is inserted into feedback circuit 100 between accumulator 24 and ramp generator 29. As in the prior implementation, summing junction 110 receives a signal $S_{OM}$ from the offset modulation source signal generator 105 and adds this signal $S_{OM}$ to the output of accumulator 24. The resultant sum is then provided to ramp generator 29. Again, signal $S_{OM}$ is not an equivalent of offset modulation signal $\phi_{OM}$ but rather is selected to generate a desired offset modulation signal $\phi_{OM}$ at the phase modulator. If $\phi_{OM}$ is desired to be a triangular waveform having an amplitude of $2\pi$, for example, $S_{OM}$ will be a triangular wave having an amplitude determined by the other portions of the control loop, i.e. the detected optical power and the front end electronics gain. As in the prior implementations, feedback circuit 100 may be implemented with digital or analog components.

Figure 12:
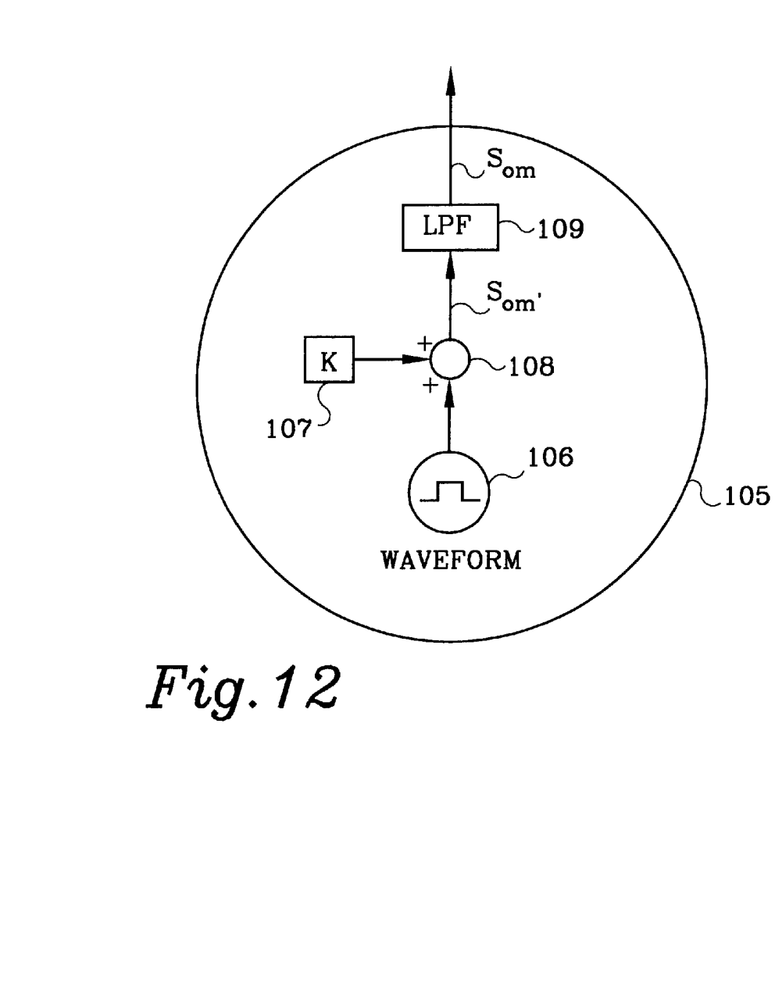
FIG. 12 is a schematic of a signal generator used in the present invention.

In all of the embodiments, a signal generator introduces a signal $S_{OM}$ that produces an offset modulation signal $\phi_{OM}$ at the input to the phase modulator. Referring to FIG. 12, a signal generator 105 is disclosed. This signal generator comprises at least a waveform generator 106 capable of producing a signal of the desired shape, such as a square wave or a triangle wave. The signal generator 106 may also include an optional summing junction 108 that receives a DC signal (K) from source 107 and adds this signal to the periodic waveform generated by the signal generator. This signal creates a DC bias (i.e. a non-zero mean) in the resulting signal $\phi_{OM}$. In some implementations of the invention, DC signal K may be selectively turned on or off according to the rotation rate observed by the photodetector. In these implementations, the DC bias of the resulting offset modulation signal $\phi_{OM}$ will force the gyroscope out of the deadband when low rotation rates are observed.

Figure 13:
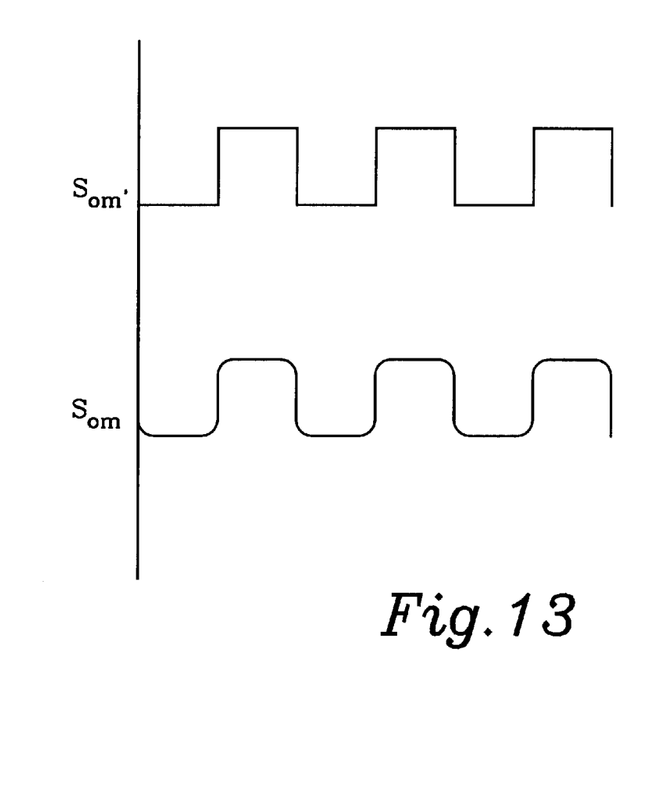
FIG. 13 shows the offset modulation source signal before and after such a signal is passed through a low pass filter.

The signal generator of FIG. 12 also includes an optional low pass filter 109 to tailor the modulation signal $S_{OM}$. When utilized, this filter eliminates the high frequency components of signal $S_{OM}'$. If these high frequency components are not eliminated, they may cause "ringing" or destabilization in the feedback loop. The low pass filter shown in FIG. 12 serves to "round off" the edges of the source waveform. FIG. 13 shows this rounding phenomenon when signal $S_{OM}'$ (the signal input to low pass filter 109) is a square wave.

Because the offset modulation signal $\phi_{OM}$ is equivalent to biasing the gyroscope at an operating point outside of the deadband, the output signal for the gyroscope will reflect the offset as a rotation rate. Therefore, the offset bias must be subtracted (i.e. "stripped") from the gyro output when the offset modulation is active. One way to accomplish this stripping is to continuously estimate the magnitude and/or the phase disturbance caused by the offset modulation, and to compensate the output data accordingly. This estimation and compensation may be implemented with circuitry in the feedback loop or the rotation rate indicator.

The corresponding structures, materials, acts and equivalents of all elements in the claims below are intended to include any structure, material, or acts for performing the functions in combination with other claimed elements as specifically claimed. The scope of the invention should be determined by the appended claims and their legal equivalents, rather than by the examples given above.

We claim:

1. A fiber optic gyroscope having a photodetector coupled to a phase modulator by a feedback circuit, the feedback circuit comprising:
   a demodulator in communication with said photodetector;
   a rate accumulator in communication with said demodulator;
   a ramp generator in communication with said rate accumulator producing a feedback modulation signal; and
   an offset modulation signal generator introducing a source signal into said feedback circuit to produce an offset modulation signal configured to average said feedback modulation signal, said offset modulation signal having a cyclical component with an amplitude substantially equal to an integer multiple of $2\pi$.

2. The fiber optic gyroscope of claim 1 wherein said offset modulation signal generator comprises a waveform generator and a low pass filter.

3. The fiber optic gyroscope of claim 2 wherein said feedback circuit further comprises:
   an analog-to-digital converter coupling said photodetector to said demodulator; and
   a digital-to-analog converter coupling said ramp generator to said phase modulator.

4. A fiber optic gyroscope of claim 3 wherein said offset modulation signal generator is connected to an input of said rate accumulator.

5. The fiber optic gyroscope of claim 4 wherein said offset modulation signal has a non-zero mean and wherein the cyclical component of said offset modulation signal exhibits a triangular waveform.

6. The fiber optic gyroscope of claim 2 wherein said offset modulation signal generator is coupled to an input of said rate accumulator.

7. The fiber optic gyroscope of claim 2 wherein said offset modulation signal generator is connected to an input of said ramp generator.

8. The fiber optic gyroscope of claim 2 wherein the cyclical component of said offset modulation signal exhibits a triangular waveform.

9. The fiber optic gyroscope of claim 1 wherein said feedback circuit further comprises:
   an analog-to-digital converter coupling said photodetector to said demodulator; and
   a digital-to-analog converter coupling said ramp generator to said phase modulator.

10. The fiber optic gyroscope of claim 1 wherein said offset modulation signal generator is coupled to an input of said rate accumulator.

11. The fiber optic gyroscope of claim 1 wherein said offset modulation signal generator is connected to an input of said ramp generator.

12. The fiber optic gyroscope of claim 1 wherein the cyclical component of said offset modulation signal exhibits a triangular waveform.

13. The fiber optic gyroscope of claim 1 wherein the cyclical component of said offset modulation signal exhibits a sawtooth waveform.

14. The fiber optic gyroscope of claim 1 wherein said offset modulation signal has a non-zero mean.

15. The fiber optic gyroscope of claim 1 wherein said rate accumulator is an integrator.

16. A method of operating a Sagnac interferometer comprising the steps of:
   providing an electrical representation of rotation data based upon phase differences between first and second beams of light;
   demodulating said electrical representation to extract a rotation rate;
   providing a modulation signal having a modulation component and a nulling component, the nulling component based at least in part upon said rotation rate to a phase modulator for modulating said first and second beams of light; and
   dithering said modulation signal such that said modulation signal is averaged, thus reducing errors in said rotation rate imposed by said modulation signal.

17. The method of claim 16 wherein said modulation signal is dithered by a linear waveform.

18. The method of claim 17 wherein said linear waveform has an amplitude substantially equal to an integer multiple of $2\pi$.

19. The method of claim 18 wherein said step of demodulating said electrical representation comprises the step of compensating said rotation rate for said dithering step.

20. A feedback electronics circuit for a fiber optic gyroscope, the feedback electronics circuit comprising:
   a demodulator configured to receive a first signal based upon a rate of gyroscope rotation, the demodulator being further configured to demodulate said first signal to produce a rotation signal;
   an accumulator configured to receive and to integrate said rotation signal to produce a gyroscope output;
   a signal generator configured to receive said gyroscope output and to produce a feedback modulation signal based upon said gyroscope output; and
   an offset modulation signal generator configured to produce an offset modulation signal, the offset modulation signal being associated with an averaging of said feedback modulation signal such that deadband errors are reduced.

21. The feedback electronics circuit of claim 20 wherein said offset modulation signal is a linear waveform having a cyclical component with an amplitude substantially equal to an integer multiple $2\pi$.

* * * * *